United States Patent
Johansson et al.

(10) Patent No.: US 9,043,114 B2
(45) Date of Patent: *May 26, 2015

(54) MODULE FOR DETERMINING OF REFERENCE VALUES FOR A VEHICLE CONTROL SYSTEM

(75) Inventors: Oskar Johansson, Stockholm (SE); Jörgen Hansson, Hägersten (SE); Henrik Pettersson, Södertälje (SE)

(73) Assignee: SCANIA CV AB (SE)

( * ) Notice: Subject to any disclaimer, the term of this patent is extended or adjusted under 35 U.S.C. 154(b) by 145 days.

This patent is subject to a terminal disclaimer.

(21) Appl. No.: 13/377,219

(22) PCT Filed: May 31, 2010

(86) PCT No.: PCT/SE2010/050590
§ 371 (c)(1),
(2), (4) Date: Dec. 9, 2011

(87) PCT Pub. No.: WO2010/144027
PCT Pub. Date: Dec. 16, 2010

(65) Prior Publication Data
US 2012/0083986 A1 Apr. 5, 2012

(30) Foreign Application Priority Data
Jun. 10, 2009 (SE) .................................. 0950436

(51) Int. Cl.
*B60T 8/32* (2006.01)
*B60W 30/14* (2006.01)
*B60W 40/06* (2012.01)

(52) U.S. Cl.
CPC .............. *B60W 30/143* (2013.01); *B60W 40/06* (2013.01); *B60W 2550/142* (2013.01); *B60W 2550/402* (2013.01); *B60W 2720/103* (2013.01); *Y02T 10/56* (2013.01)

(58) Field of Classification Search
CPC .......... B60K 28/165; B60W 2550/10; B60W 2550/142; B60W 2720/103; B60W 30/143
USPC ........................................ 701/93, 96; 180/170
See application file for complete search history.

(56) References Cited

U.S. PATENT DOCUMENTS 8,620,558 B2 * 12/2013 Johansson et al. ............... 701/93
2002/0173881 A1 * 11/2002 Lash et al. ........................ 701/1
(Continued)

FOREIGN PATENT DOCUMENTS

DE 10 2005 045 891 2/2007
JP 7117524 A 5/1995
(Continued)

OTHER PUBLICATIONS

International Search Report dated Sep. 9, 2010, issued in corresponding international application No. PCT/SE2010/050590.

*Primary Examiner* — Helal A Algahaim
*Assistant Examiner* — Nga X Nguyen
(74) *Attorney, Agent, or Firm* — Ostrolenk Faber LLP

(57) ABSTRACT

A module for determination of speed set-point values $v_{ref}$ for a vehicle's control systems, comprising an input unit adapted to input, e.g., by the vehicle's driver, of a reference speed $v_{set}$ which is the speed desired by the driver for the vehicle. The module includes a horizon unit to determine a horizon by means of received position data and map data of an itinerary made up of route segments with at least one characteristic for each segment; a processor unit to calculate $v_{ref}$ for the vehicle's control systems across the horizon according to rules pertaining to categories in which segments within the horizon are placed, so that $v_{ref}$ is within a range bounded by $v_{min}$ and $v_{max}$, where $v_{min} \leq v_{set} \leq V_{max}$, which control system regulates the vehicle according to these set-point values.

20 Claims, 3 Drawing Sheets

(56) References Cited

U.S. PATENT DOCUMENTS

2003/0221886 A1   12/2003   Petrie, Jr.
2004/0068359 A1*   4/2004   Neiss et al. .................... 701/96
2007/0265759 A1*   11/2007   Salinas et al. ................. 701/93
2010/0161195 A1*   6/2010   Shin ............................... 701/93
2010/0204897 A1*   8/2010   Labuhn et al. ................. 701/93

FOREIGN PATENT DOCUMENTS

JP        2007-276542    10/2007
SE          529578 C2    9/2007

\* cited by examiner

MODULE FOR DETERMINING OF REFERENCE VALUES FOR A VEHICLE CONTROL SYSTEM

CROSS-REFERENCE TO RELATED APPLICATIONS

The present application is a 35 U.S.C. §§371 national phase conversion of PCT/SE2010/050590, filed May 31, 2010, which claims priority of Swedish Application No. 0950436-6, filed Jun. 10, 2009, the contents of which are incorporated by reference herein. The PCT International Application was published in the English language.

FIELD OF THE INVENTION

The present invention relates to a module for determining set-point values of vehicle speed for a control system in a vehicle.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle thereafter regulates for example the vehicle's engine so that the desired speed can be maintained. If the vehicle is equipped with an automatic gear change system, the vehicle's gears can be changed so that the cruise control system can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has leveled out at the top, provided that the vehicle's speed does not drop below a certain level. Lowering the speed at the end of an upgrade makes it possible to regain speed on a subsequent downgrade without using the engine to accelerate. When the vehicle approaches the bottom of a dip, the system endeavours to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes it possible to save fuel.

If the topology ahead is made known by the vehicle having map data and GPS, such a system can be made more robust and can also change the vehicle's speed in anticipation.

Unlike a constant cruise control, a cruise control for hilly terrain will actively vary the vehicle's speed. For example, the speed before a steep downgrade will be lowered so that the vehicle can utilise more of the energy which comes gratis downhill instead of braking it away. Similarly, the speed can be increased before a steep upgrade to avoid allowing the vehicle to lose too much speed and time.

A problem is that it is difficult for the control system to determine how much the cruise control should be allowed to vary the speed.

This is because external parameters such as traffic situation, driver temperament and terrain also affect which range is suitable for a specific situation.

Generally speaking, a larger speed range results in more fuel saving, but also large speed variations, which may be disturbing to other traffic.

In the aforesaid function Scania Ecocruise® there is a firmly specified speed range between the truck's speed limit (which is often 89 km/h) and a lower speed which is 20 km/h below set cruise control speed, but never less than 60 km/h.

US 2003/0221886 refers to a speed control in which a speed range is set. The system can look forward and incorporate coming downgrades and upgrades in the calculations. However, the specification gives no details about how this is done in practice.

DE 10 2005 045 891 refers to a cruise control system for a vehicle in which a range is set within which the speed is allowed to vary. The object is inter alia to cater for wind conditions to which the vehicle is subject.

JP 2007276542 refers to a cruise control in which the vehicle's speed is allowed to fluctuate about a predetermined speed in order to reduce fuel consumption.

The object of the present invention is to propose an improved cruise control module which caters for road sections ahead by speed adaptation and, in particular, a module which simplifies handling and constitutes a usable aid for the vehicle driver.

The present invention relates to a user interface for such a function.

SUMMARY OF THE INVENTION

The object described above is achieved with a module for determination of speed set point ratios for a vehicle control system.

The regulating system according to the invention makes it possible to minimise the amount of fuel needed during the vehicle's journey by taking information about the itinerary into account. Map data, e.g. in the form of a database on board the vehicle with altitude information, and a positioning system, e.g. GPS, provide information about road topography along the itinerary. The control system is thereafter supplied with set-point values and regulates the vehicle according to them.

Using a system that practices a rule-based method results in a predictable robust method which can quickly calculate set-point values for the control system or control systems in the vehicle.

According to the present invention, in one embodiment the driver of the vehicle can set a cruise control speed and a range around it within which the cruise control is actively allowed to operate. This need not be specifically in km/h but may for example be in terms of levels or percentages of set cruise control speed.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Information about a vehicle's itinerary can be used to regulate its set-point speed $v_{ref}$ for vehicle control systems, for example, the cruise control in the vehicle, in anticipation, for example, of topology in the horizon of the vehicle in order to save fuel, increase safety and enhance comfort. Other set-point values for other control systems may also be regulated. Topology greatly affects the control of, in particular, the driveline of heavy vehicles, since much more torque is required uphill than downhill and to make it possible to climb some hills without changing gear.

The vehicle is provided with a positioning system and map information, and position data from the positioning system and topology data from the map information are used to construct a horizon which illustrates the nature of the itinerary. In the disclosure hereof, GPS (Global Positioning System) is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
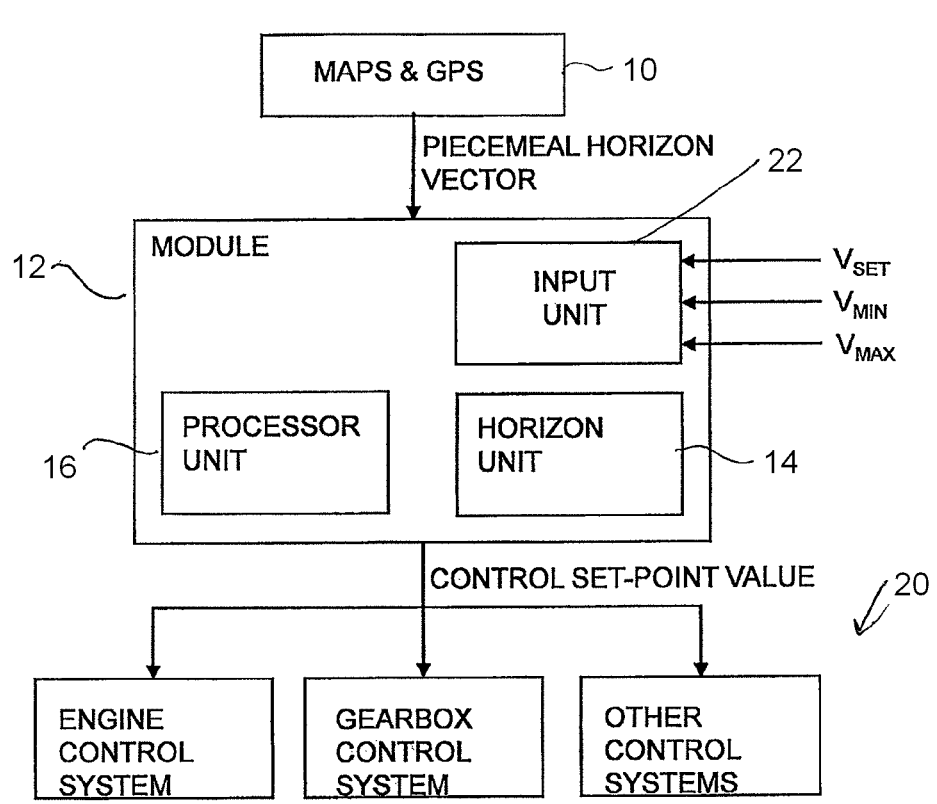
FIG. 1 depicts the functional context of the regulating module in the vehicle according to an embodiment of the invention.

FIG. 1 illustrates how a module incorporates map and GPS information 10 about the itinerary. The itinerary is exemplified below as a single route for the vehicle but it should be appreciated that various conceivable itineraries are incorporated as information via maps and GPS or other positioning systems. The driver may also register the starting point and destination point of the intended journey, in which case the unit uses map data etc. to calculate a suitable route. The itinerary or, if there are two or more possible alternatives, the itineraries are sent bit by bit via CAN (controller area network), a serial bus system specially adapted for vehicles, to a module 12 for regulation of set-point values, which module may be separate from or form part of the systems which are to use the set-point values for regulating. Alternatively, the unit with maps and a positioning system may also be part of a system which uses the set-point values for regulating. In the regulating module 12, the bits are put together in a horizon unit 14 to form a horizon and are processed by the processor unit 16 to create an internal horizon by which the control system can regulate. If there are two or more alternative itineraries, a number of internal horizons are created for the various alternatives. The control system may be any of the various control systems in the vehicle, e.g. cruise control, gearbox control system or some other control system. A horizon is usually put together for each control system, since the control systems regulate by different parameters. The horizon is then continually supplemented by new bits from the unit with GPS and map data to maintain a desired length of horizon. The horizon is thus updated continuously when the vehicle is in motion.

CAN is thus a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

The present invention relates to a module 20 for determining set-point values $v_{ref}$ for a vehicle's control system, which module is schematically illustrated in FIG. 1.

The module comprises an input unit 22 configured and operable to input, e.g. by the vehicle's driver, of a reference speed $v_{set}$ which is the speed desired by the driver for the vehicle.

The module further comprises a horizon unit 14 configured and operable to determining a horizon by means of received position data and map data of an itinerary made up of route segments with at least one characteristic for each segment; and a processor unit 16 configured and operable to calculating $v_{ref}$ for the vehicle's control systems across the horizon according to rules pertaining to categories in which segments within the horizon are placed, so that $v_{ref}$ is within a range bounded by $v_{min}$ and $v_{max}$, where $v_{min} \leq v_{set} \leq v_{max}$, i.e. substantially performing the method steps described below as steps B) to E).

Finally, the control system is adapted to regulating the vehicle according to these set-point values.

Set-point values $v_{ref}$ for the control system in the vehicle may thus be allowed to vary between the two aforesaid speeds $v_{min}$ and $v_{max}$. When the regulating module predicts an internal horizon for the vehicle's speed, the vehicle's speed may then vary within that range.

The result is a module which can be used in a vehicle to regulate set-point values in a computationally effective way, and the module may be part of a control system for which it is intended to regulate set-point values, or be a freestanding module separate from the control system.

According to a preferred embodiment of the invention, the range $v_{min}$ and $v_{max}$ is set manually by the driver via said input unit 22. The limits of the range may preferably be set by means of one or more buttons in the steering wheel or on the instrument panel.

If one button is used, various levels with different range widths can be stepped through by repeated button pressing. The various range widths are preferably presented on a display.

If instead the input unit comprises two buttons, one of them is used to set $v_{min}$ and the other to set $v_{max}$. The buttons are arranged on the input unit, preferably close to the input of the reference speed $v_{set}$.

The input need not be specifically in km/h but may for example be in terms of levels or percentages of set cruise control speed.

According to an example, the driver sets 80 km/h and a level, and the following are examples of the levels:

−5 km/h+2 km/h, i.e. $v_{min}$ is $v_{set}$−5 km/h and $v_{max}$ is $v_{set}$+2 km/h.     1:

−7 km/h+4 km/h, i.e. $v_{min}$ is $v_{set}$−7 km/h and $v_{max}$ is $v_{set}$+4 km/h.     2:

−10 km/h+6 km/h, i.e. $v_{min}$ is $v_{set}$−10 km/h and $v_{max}$ is $v_{set}$+6 km/h.     3:

If the driver chooses level 1, it means that the engine can deliver torque to vary the speed between 75 and 82 km/h.

There is according to an embodiment a predetermined number of different levels for the range $v_{min}$ and $v_{max}$ with different range widths, as in the above example. In other words, $v_{min}$ and $v_{max}$ for each level are first and second predetermined numbers of km/h respectively below and above $v_{set}$.

According to another embodiment, $v_{min}$ and $v_{max}$ for each level are first and second predetermined percentages respectively below and above $v_{set}$. According to that embodiment, the range limits vary by 2 to 20%, preferably by 4 to 15%, from the reference speed $v_{set}$.

According to an embodiment, $v_{min}$ and $v_{max}$ are settable independently of one another.

According to an alternative embodiment, $v_{min}$ and $v_{max}$ are set automatically by calculations of suitable ranges preferably calculated in the module.

Such automatic calculation may be suitable if the vehicle also has an adaptive cruise control (Autonomous Intelligent Cruise Control: AICC) which makes it possible to set a time gap relative to a vehicle ahead, thereby also making it possible to associate it with the above levels. In such cases a shorter time gap will be associated with a level with a small speed span and a longer time gap will be associated with levels which allow larger speed variations.

The present invention has the advantage that the range which best suits the driver, the traffic situation and the terrain is always available in the vehicle. If AICC and levels are associated, the same button can preferably be used to set both. The driver can him/herself act upon the system, which should enhance its acceptance as a driving aid.

If the vehicle is also equipped with a so-called retarder cruise control (constant speed brake), this will not be affected but will always have a value higher than the given range.

Figure 2:
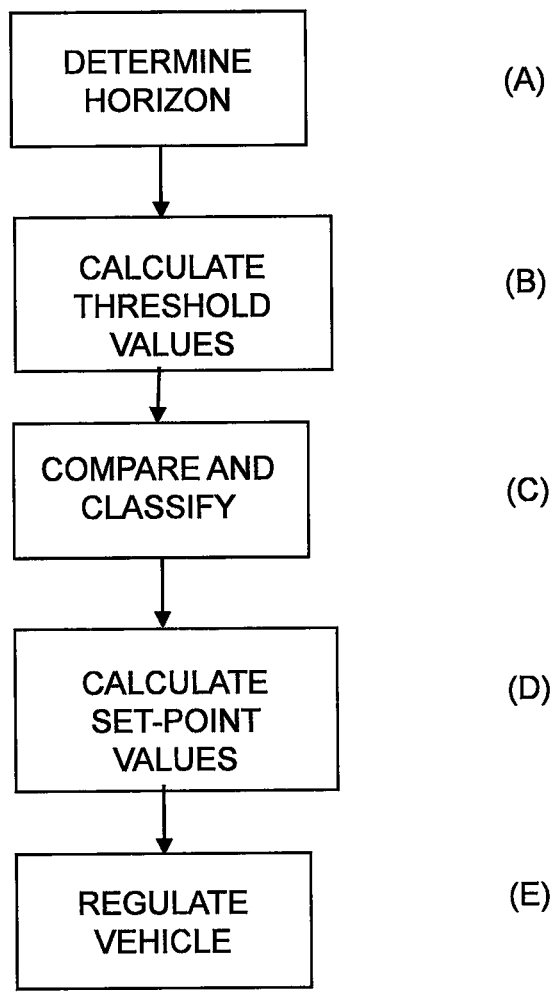
FIG. 2 depicts a flowchart for the steps which the module is adapted to performing according to an embodiment of the invention.

FIG. 2 is a flowchart which illustrates schematically the method steps which the module is adapted to performing. In this context, a related patent application filed at the same time is also referred to.

A first step A) determines a horizon based on position data and map data of an itinerary made up of route segments with at least one characteristic for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. When the destination point of the journey is defined and within the length of the horizon, the horizon is preferably no longer added to.

The horizon is made up of route segments which have one or more inter-related characteristics. The horizon is here exemplified in matrix form in which each column contains a characteristic for a segment. A matrix covering 80 m forwards of an itinerary may take the following form:

$$\begin{bmatrix} dx, & \% \\ 20, & 0.2 \\ 20, & 0.1 \\ 20, & -0.1 \\ 20, & -0.3 \end{bmatrix}$$

where the first column is the length of each segment in meters (dx) and the second column the gradient in % of each segment. The matrix is to be taken to mean that for 20 meters forwards from the vehicle's current position the gradient is 0.2%, followed by 20 meters with a gradient of 0.1%, and so on. The values for segments and gradients need not be expressed in relative values but may instead be expressed in absolute values. The matrix is with advantage vector-formed but may instead be of pointer structure, in the form of data packages or the like. There are various other conceivable characteristics, e.g. radius of curvature, traffic signs, various hindrances etc.

After step A), segments within the horizon are placed in various categories in a step B) in which threshold values are calculated for at least one characteristic of segments according to one or more vehicle-specific values, which threshold values serve as boundaries for assigning segments to various categories. In the example where the characteristics of segments are gradients, threshold values are calculated for their gradients. The threshold values for the characteristic concerned are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed when the gradient of segments is used for taking decisions about the control of the vehicle:

Level road: Segment with gradient 0±a tolerance.
Steep upgrade: Segment with too steep a gradient for the vehicle to maintain speed in current gear.
Gentle upgrade: Segment with gradient between tolerance and threshold value for sharp upgrade.
Steep downgrade: Segment with such a steep downhill gradient that the vehicle is accelerated by the gradient.
Gentle downgrade: Segment with a downward gradient between the negative tolerance and the threshold value for sharp downgrade.

According to an embodiment of the invention, the characteristics of segments are their length and gradient, and placing segments in the categories described above involves calculating threshold values in the form of two gradient threshold values $l_{min}$ and $l_{max}$, where $l_{min}$ is the minimum gradient for the vehicle to be accelerated by the gradient downhill, and $l_{max}$ is the maximum gradient at which the vehicle can maintain speed without changing gear uphill. Thus the vehicle can be regulated according to the gradient and length of the road ahead so that it can be driven in a fuel economising way by means of cruise control in undulating terrain. In another embodiment, the characteristics of segments are their length and lateral acceleration, and threshold values are calculated in the form of lateral acceleration threshold values which classify segments by how much lateral acceleration they cause. The vehicle's speed can thereafter be regulated so that it can be driven in a way suited to fuel economy and traffic safety with regard to road curvature, i.e. any speed reduction before a bend is as far as possible effected without use of service brakes.

In a next step C) of the method, the characteristics, in this case the gradient, of each segment are compared with the calculated threshold values, and each segment is placed in a category by the results of the comparisons.

There might instead or in addition be for example similar classification by radius of curvature of the road, whereby bends might be classified by how much lateral acceleration they cause.

After each segment within the horizon has been placed in a category, an internal horizon for the control system can be constructed on the basis of the classification of segments and the horizon, comprising for each segment introductory speeds $v_i$ which the control system has to abide by. A speed change requested between two initial speeds $v_i$ is ramped in order to provide set-point values $v_{ref}$ for the control system which effect a gradual increase or decrease of the vehicle's speed. Ramping a speed change results in calculation of gradual speed changes which need to be made in order to achieve the speed change. In other words, ramping results in a linear speed increase. The introductory speeds $v_i$, i.e. set-point values for the vehicle's control systems, are calculated in a step D) according to the method according to the invention across the horizon according to rules pertaining to the categories in which segments within the horizon are placed. All the segments within the horizon are stepped through continuously, and as new segments are added to the horizon the initial speeds $v_i$ are adjusted in them as necessary within the range of the vehicle's reference speed $v_{set}$. $v_{set}$ is the reference speed set by the driver and desired to be kept by the vehicle's control systems within a range when the vehicle is in motion. As previously described, the range is bounded by two speeds $v_{min}$ and $v_{max}$ which may be set manually by the driver or be set automatically by calculations of suitable ranges preferably calculated in the regulating module. The vehicle is thereafter regulated in a step E) according to the set-point values, which in the example described means that the cruise control in the vehicle regulates the vehicle's speed according to the set-point values.

The vehicle-specific values of current transmission ratio, current vehicle weight, the engine's maximum torque curve, mechanical friction and/the vehicle's running resistance at current speed are preferably determined in the processor unit 16. The threshold values can therefore be determined on the basis of the vehicle's state at the time. Signals needed for determining these values may be taken from CAN or be detected by suitable sensors.

According to an embodiment, the characteristics of segments are their length and gradient and the processor unit is adapted to calculating the threshold values in the form of gradient threshold values $l_{min}$ and $l_{max}$. Thus the vehicle's speed can be regulated according to the undulation of the itinerary in order to travel in a fuel economising way.

According to another embodiment, the characteristics of segments are their length and lateral acceleration and the processor unit is adapted to calculating the threshold values in the form of lateral acceleration threshold values. This means that the vehicle's speed can be regulated according to the curvature of the road ahead, and the vehicle's speed can be pre-regulated so that unnecessary braking operations and speed increases are minimised in order to save fuel.

The horizon unit 14 is preferably configured and operable to determining the horizon continuously so long as the horizon does not exceed a planned itinerary for the vehicle, and the processor unit 16 is adapted to continuously performing the steps for calculating and updating the set-point values for the control system for the whole length of the internal horizon. In an embodiment, the horizon is thus constructed piecemeal progressively as the vehicle travels along the itinerary. The set-point values for the control system are calculated and updated continuously irrespective of whether new segments are added or not, since the set-point values to be calculated depend also on how the vehicle-specific values of the vehicle change along the itinerary.

The various rules for the segment categories therefore regulate how the initial speed $v_i$ for each segment is to be adjusted. If a segment is in the "level road" category, no change will take place in the initial speed $v_i$ to the segment. Driving the vehicle such that comfort requirements are met involves using Torricelli's equation as below to calculate the constant acceleration or retardation which needs to be applied to the vehicle:

$$v_{slut}^2 = v_i^2 + 2 \cdot a \cdot s \quad (1)$$

where $v_i$ is the initial speed in the segment, $v_{slut}$ the vehicle's speed at the end of the segment, a the constant acceleration/retardation and s the length of the segment.

If a segment is in the "steep upgrade" or "steep downgrade" category, the final speed $v_{slut}$ for the segment is predicted by solving equation (2) below:

$$v_{slut}^2 = (a \cdot v_i^2 + b) \cdot (e^{2 \cdot a \cdot s/M}) - b)/a \quad (2)$$

where $$a = -C_d \cdot \rho \cdot A/2 \quad (3)$$

$$b = F_{track} - F_{roll} - F_a \quad (4)$$

$$F_{track} = (T_{eng} \cdot i_{final} \cdot i_{gear} \cdot \mu_{gear})/r_{wheel} \quad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \quad (6)$$

$$F_a = M \cdot g \cdot \sin(\arctan(\alpha)) \quad (7)$$

$$\text{flatCorr} = 1/\sqrt{(1 + r_{wheel}/2.70)} \quad (8)$$

where $C_d$ is the air resistance coefficient, $\rho$ the density of the air, A the largest cross-sectional area of the vehicle, $F_{track}$ the force acting from the engine torque in the vehicle's direction of movement, $F_{roll}$ the force from the rolling resistance acting upon the wheels, calculated by using Michelin's rolling resistance model, $F_a$ the force acting upon the vehicle because of the gradient a of the segment, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius and M the vehicle's weight.

On segments in the "steep upgrade" category, the final speed $v_{slut}$ is thereafter compared with $v_{min}$, and if $v_{slut} < v_{min}$, then $v_i$ has to be increased so that $$v_i = \min(v_{max}, v_i + (v_{min} - v_{slut})) \quad (9)$$

otherwise no change in $v_i$ takes place, since $v_{slut}$ meets the requirement of being within the range for the reference speed.

On segments in the "steep downgrade" category, the final speed $v_{slut}$ is compared with $v_{max}$, and if $v_{slut} > v_{max}$, then $v_i$ has to be decreased so that $$v_i = \max(v_{min}, v_i - (v_{slut} - v_{max})) \quad (10)$$

otherwise no change in $v_i$ takes place, since $v_{slut}$ meets the requirement of being within the range for the reference speed.

Torricelli's equation (1) is here again used to calculate whether it is possible to achieve $v_{slut}$ with the initial speed $v_i$ with comfort requirement, i.e. with predetermined maximum constant acceleration/retardation. If this is not possible because of the length of the segment, $v_i$ is increased or decreased so that the comfort requirement, i.e. not too much acceleration/retardation, can be maintained.

On segments in the "gentle upgrade" category, the set-point value $v_{ref}$ is allowed to vary between $v_{min}$ and $v_{set}$ when a new segment is incorporated, i.e. $v_{min} \leq v_{ref} \leq v_{set}$. If $v_{ref} \geq v_{min}$, no acceleration of the vehicle is effected. If however $v_{ref} < v_{min}$, then $v_{ref}$ is applied to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$, then $v_{ref}$ is applied to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $l_{min}$ and $l_{max}$, i.e. the gradient on the segment has to be smaller than $l_{min}$ if the gradient is negative or greater than $l_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade" or "gentle downgrade" categories. This therefore applies when the entry speeds to segments are corrected according to subsequent segments.

All speed changes requested are therefore ramped by means of Torricelli's equation (1) so that they take place with comfort requirement. Thus it is a general rule not to raise the set-point speed $v_{ref}$ on an upgrade, since any possible speed increase of $v_{ref}$ has to take place before the climb begins if the vehicle is to be driven in a cost-effective way. For the same reason, the set-point speed $v_{ref}$ should not be lowered on a downgrade, since any possible speed decrease of $v_{ref}$ has to take place before the downhill run.

By continuously stepping through all the segments within the horizon, it is possible to determine an internal horizon which provides predicted initial values $v_i$ for each segment. According to an embodiment, step A) is performed continuously so long as the horizon does not exceed a planned itinerary for the vehicle, and steps B) to E) are performed continuously for the whole length of the horizon. The horizon is updated preferably piecemeal, and has according to an embodiment not the same continuity in its updating as steps B) to E). The internal horizon is updated continually as new segments are added to the horizon, e.g. two to three times per second. Continuous stepping through segments within the horizon involves continuously calculating the initial values $v_i$ for each segment, and calculating an initial value $v_i$ may entail having to change initial values both forwards and backwards within the internal horizon. Where for example a predicted speed in a segment is outside a set range, it is desirable to correct the speed in preceding segments.

Figure 3:
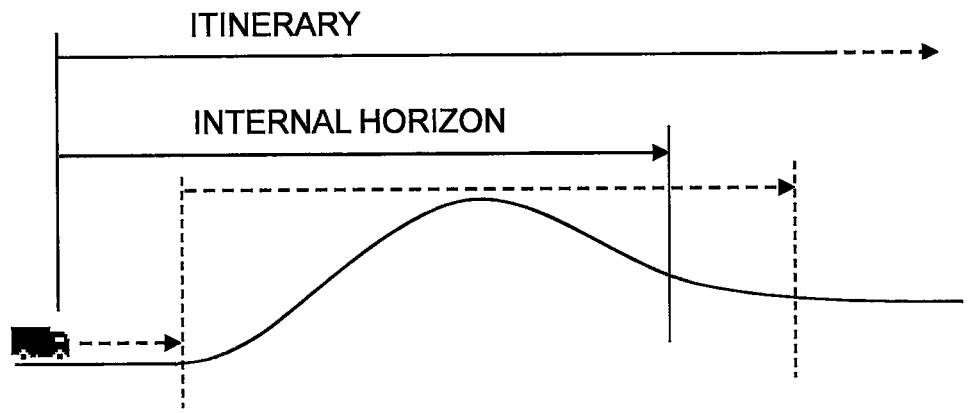
FIG. 3 illustrates the length of a control system's horizon in relation to the length of the itinerary for the vehicle.
Figure 4:
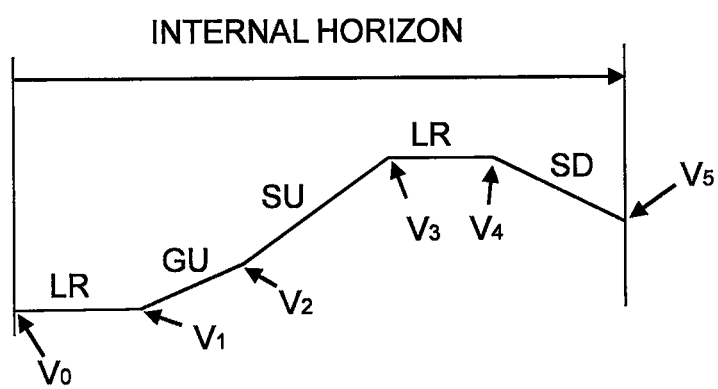
FIG. 4 illustrates the various speeds predicted and the categories of segments which are continuously updated as new segments are added to the horizon.

FIG. 3 depicts the internal horizon relative to the itinerary. The internal horizon moves continually forwards as indicated by the broken inner horizon moved forward. FIG. 4 depicts an example of an internal horizon in which the various segments are placed in a category. In the diagram "LR" stands for "level road", "GU" for "gentle upgrade", "SU" for "steep upgrade" and "SD" for "steep downgrade". The speed is initially $v_0$, and if this is not $v_{set}$, the set-point values are ramped from $v_0$ to $v_{set}$ with comfort acceptance according to Torricelli's equation (1) because the category is "level road". The next segment is a "gentle upgrade" and no change of $v_{ref}$ takes place so long as $v_{min} \leq v_{ref} \leq v_{set}$, since no acceleration need be applied in this segment. The next segment is a "steep upgrade", so the final speed $v_3$ for it is predicted by means of formula (2), so $v_2$ has to be increased if $v_3 < v_{min}$ according to formula (9). The next segment is "level road", so $v_{ref}$ is changed towards $v_{set}$ with limitation of the comfort requirement from Torricelli's equation (1). Thereafter comes a segment which is a "steep downgrade", so the final speed $v_5$ is predicted by means of formula (2) and $v_4$ has to be decreased if $v_5 > v_{max}$ according to formula (10). As soon as a speed backwards in the internal horizon is changed, the remaining speeds backwards in the internal horizon are adjusted to be able to fulfil the speed further forwards. At each speed change which has to be effected, the method according to the invention calculates by means of Torricelli's equation (1) whether it is possible to achieve the speed change with comfort requirement. If not, the entry speed to the segment is adjusted so that comfort requirement can be maintained.

The present invention is not limited to the embodiments described above. Various alternatives, modifications and equivalents may be used. The aforesaid embodiments therefore do not limit the scope of the invention which is defined by the attached claims.

The invention claimed is:

1. A module for determination of speed set-point values for a control system of a vehicle, the module comprising:
   a reference speed input unit configured and operable to input a reference speed, which is the speed obtained for a driver of the vehicle;
   a position and map data input unit configured to receive position data and map data for the vehicle;
   a horizon and route segment determination unit configured and operable to determine a horizon according to the received position data and map data, and to determine an itinerary made up of route segments with at least one road topography characteristic for each route segment;
   a route segment category assigning and speed calculation unit configured and operable to assign, according to the at least one road topography characteristic, each route segment to a route segment category of a plurality of route segment categories,
   to calculate automatically an introductory speed for each route segment, and
   to generate, by adjusting each introductory speed according to rules of the route segment category, the speed set-point values across the horizon such that the speed set-point values are within a range bounded by $v_{min}$ and $v_{max}$, where $v_{min} \leq v_{set} \leq v_{max}$; and
   the control system is configured and operable to regulate the vehicle according to the speed set-point values.

2. The module according to claim 1, wherein the processor unit is configured to calculate the speed set-point values such that the range $v_{min}$ and $v_{max}$ is set manually by the driver via the input unit.

3. The module according to claim 1, wherein the processor unit is configured to calculate a predetermined number of different levels for the range $v_{min}$ and $v_{max}$ with different range widths.

4. The module according to claim 3, wherein $v_{min}$ and $v_{max}$ for each level are first and second predetermined numbers of km/h respectively below $v_{set}$ and above $v_{set}$.

5. The module according to claim 3, wherein $v_{min}$ and $v_{max}$ for each level are speeds set, respectively, based on first and second predetermined percentages below $v_{set}$ and above $v_{set}$.

6. The module according to claim 1, further comprising a regulating module configured and operable to automatically set the range $v_{min}$ and $v_{max}$ by calculations of speed ranges.

7. The module according to claim 6, wherein the regulating module is configured and operable to set the range $v_{min}$ and $v_{max}$ such that the range width between $v_{min}$ and $v_{max}$ is determined automatically according to a set time gap relative to a second vehicle ahead of the vehicle with the control system so that the range width is smaller for a short time gap and larger for a longer time gap.

8. The module according to claim 1, wherein the processor unit is configured and operable:
   to calculate threshold values for the at least one road topography characteristic of the route segments according to one or more vehicle-specific values,
   wherein the threshold values serve as boundaries for assigning the route segments to the route segment categories;

to compare at least one road topography characteristic of each route segment with the calculated threshold values; and to assign each route segment to a route segment category according to results of the comparison.

9. The module according to claim 8, wherein the processor unit is configured to determine the one or more vehicle-specific values according to at least one of a current transmission ratio, a current vehicle weight, a torque curve of an engine of the vehicle, mechanical friction and a running resistance of the vehicle at current speed.

10. The module according to claim 8, wherein the characteristics of route segments are the route segment length and road gradient, and the processor unit is adapted to calculate the threshold values in the form of road gradient threshold values $l_{min}$ and $l_{max}$.

11. The module according to claim 8, wherein the characteristics of route segments are their length and lateral acceleration, and the processor unit is configured and operable to calculate the threshold values in the form of lateral acceleration threshold values.

12. The module to claim 1, wherein the horizon unit includes GPS to provide received position data which are determined by using the GPS.

13. The module to foregoing claim 1, wherein the horizon unit is configured and operable to determine the horizon continuously as long as the horizon does not exceed a planned itinerary for the vehicle, and the processor unit is configured and operable to continuously perform steps for calculating and updating the set-point values for the control system for the whole length of the horizon.

14. The module according to claim 1, wherein the input unit is configured to receive the reference speed $v_{ref}$ such that the driver of the vehicle inputs the reference speed $v_{ref}$.

15. The module according to claim 8, wherein the processor unit is configured to determine the one or more vehicle-specific values according to a current transmission ratio.

16. The module according to claim 8, wherein the processor unit is configured to determine the one or more vehicle-specific values according to a current vehicle weight.

17. The module according to claim 8, wherein the processor unit is configured to determine the one or more vehicle-specific values according to a torque curve of an engine of the vehicle.

18. The module according to claim 8, wherein the processor unit is configured to determine the one or more vehicle-specific values according to mechanical friction.

19. The module according to claim 8, wherein the processor unit is configured to determine the one or more vehicle-specific values according to a running resistance of the vehicle at current speed.

20. A module for determination of speed set-point values for a control system of a vehicle, the module comprising:

means for inputting a reference speed, which is the speed obtained for a driver of the vehicle;

means for receiving position data and map data for the vehicle;

means for determining a horizon according to the received position data and map data, and for determining an itinerary made up of route segments with at least one road topography characteristic for each route segment;

means for assigning, according to the at least one road topography characteristic, each route segment to a route segment category of a plurality of route segment categories, for calculating an introductory speed for each route segment, and for generating, by adjusting each introductory speed according to rules of the route segment category, the speed set-point values across the horizon such that the speed set-point values are within a range bounded by $v_{min}$ and $v_{max}$, where $v_{min} \leq v_{set} \leq v_{max}$; and the control system is configured and operable to regulate the vehicle according to the speed set-point values.

* * * * *